(No Model.)
S. BULL.
SOLDERING CLAMP.
No. 325,497. Patented Sept. 1, 1885.
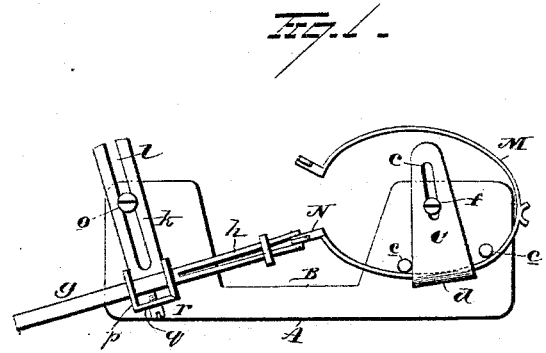
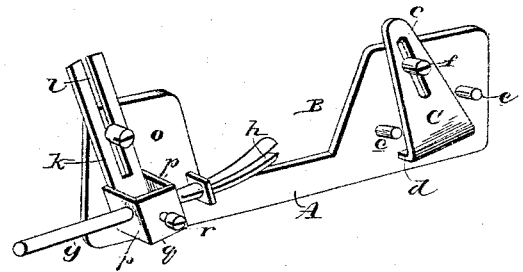
WITNESSES
INVENTOR
Sumner Bull

United States Patent Office.

SUMNER BULL, OF WALDEN, NEW YORK.

SOLDERING-CLAMP.

SPECIFICATION forming part of Letters Patent No. 325,497, dated September 1, 1885.

Application filed May 13, 1885. (No model.)

*To all whom it may concern:*

Be it known that I, SUMNER BULL, of Walden, in the county of Orange and State of New York, have invented certain new and useful Improvements in Soldering-Tools; and I do hereby declare the following to be a full, clear, and exact description of the invention, such as will enable others skilled in the art to which it appertains to make and use the same.

My invention relates to an improvement in soldering-tools, and more particularly to tools for use in connection with soldering the ears to the frames in spectacles and eyeglasses.

Hitherto it has been customary to pin or otherwise secure the frame and ear to a piece of charcoal or other deoxidizing agent for the retention of heat, and apply the solder thereto while held in that position. This method has proved unsatisfactory on account of the liability of the parts to become accidentally displaced, and the consequent necessity of doing the work over again. Annoyance often occurs, also, from the soldering of the holding-pins fast to the joint, and from solder running into the screw-holes or where it is not needed.

The object of my present invention is to provide means for holding the frame and ear securely in the desired position for soldering, whereby the annoyance hitherto experienced may be avoided and a vast amount of time saved.

With these ends in view my invention consists in certain features of construction and combinations of parts, as will be hereinafter described, and pointed out in the claims.

In the accompanying drawings, Figure 1 is a view, in side elevation, of the tool with the frame and ear in position for being soldered, and Fig. 2 is a view of the tool.

A represents the body of the tool. It consists of a flat metal plate three inches long by one inch wide, more or less, the central portion of one side being cut away, as shown, forming the recess B. The end portions of the plate are provided, respectively, with clamps for holding the frame and the ear or piece to be soldered to the frame. The clamp for holding the frame consists of two pins, $c$, located a short distance apart and forming an abutment for the concave face of the frame M. A plate, C, having its broad end lipped over, as shown at $d$, to take on the convex face of the frame, is located between the pins $c$, and provided with an elongated closed slot, $e$, through which a set-screw, $f$, extends into the plate A. Thus by placing the frame M with its concave face against the pins $c$, and the end to be operated upon extending over the cut-away portion B, and by placing the lip on the end of the plate C in engagement with the convex face of the frame between the pins, drawing the frame by means of the plate into snug contact with the pins, and securing the plate in this adjustment by the set-screw $f$, the frame is firmly secured to the plate A, and is not liable by any ordinary accident to become displaced in the slightest degree.

The clamp for holding the ear N or piece to be soldered to the frame M consists of a small rod, $g$, of some spring metal, having one of its ends split for quite a distance, as shown at $h$, the two branches or jaws being so bent as to normally assume a position sufficiently open at their ends to freely admit the piece to be held. The rod $g$ is secured to the plate in longitudinal and rotary adjustment by means of a flat plate, $k$, provided with an elongated slot, $l$, through which a set-screw, $o$, extends into the plate, and further provided with a pair of upwardly or outwardly extending perforated ears, $p$, through which the rod $g$ extends. The plate $k$ is also provided with a lug or ear, $q$, either at the bottom, as shown in Fig. 4, or at the side, as shown in Fig. 2, located at right angles to and near or in contact with the ears $p$, through which a set-screw, $r$, extends, and impinges against the rod $g$, to lock it in the required longitudinal and rotary adjustment within its bearings in the ears $p$. The set-screw $o$ admits of the plate $k$ being swung on the body A to the right or left, or slid up or down, and serves to lock the plate $k$ to the body-plate A in the desired adjustment. Thus the biting end of the rod $g$ may be located over the cut-away portion B, and in such proximity to the end of the frame as to hold the ear N in the proper position with respect to the end of the frame to be soldered thereto.

The adjustments above explained occupy but a few moments, and the pieces to be united are thereby held securely in readiness for the solder.

The plate with the frame and ear in position is now ready to be laid upon a piece of charcoal or other heat-retaining agent suitable to the purpose, the cut-away portion B allowing the ends of the parts to be united to be exposed directly to the action of the charcoal or other substance employed.

The above-described tool has the advantages of being simple, convenient, effective, and durable, and enables the operator to perform a neat and satisfactory job in about one-tenth of the time ordinarily consumed.

It is evident that many changes might be resorted to in the form and arrangement of the several parts described without departing from the spirit and scope of my invention. For example, the pins might be exchanged for lugs having curved faces or slotted to receive the frame, and the plate C might be simply a narrow strip, and the slot in plate k closed. Hence I do not wish to limit myself strictly to the construction herein set forth; but, Having fully described my invention, what I claim as new, and desire to secure by Letters Patent, is—

1. The combination, with the body-plate and a clamp secured thereto, and consisting, essentially, of two rigid bearings adapted to engage the concave face of the frame, and an adjustable bearing located between and adapted to hold the frame in contact with the rigid bearings, of a movable clamp constructed to hold the piece to be soldered to said frame, substantially as set forth.

2. The combination, with a flat plate having a cut-away portion, of the rigid bearings and the adjustable bearing located on one side of said cut-away portion, and the adjustable plate and longitudinally-adjustable rod provided with a clamp located on the other side of said cut-away portion, substantially as set forth.

In testimony whereof I have signed this specification in the presence of two subscribing witnesses.

SUMNER BULL.

Witnesses:
ALEX. K. RIDER,
W. C. STEVENS.